United States Patent [19]

Brown

[11] Patent Number: 4,626,123
[45] Date of Patent: Dec. 2, 1986

[54] CONNECTOR FOR TUBULAR BARS AND ATTACHMENT MEMBERS IN A SPACE FRAMEWORK

[76] Inventor: Angus J. D. Brown, 10 Travers Road, London N. 7, England

[21] Appl. No.: 551,996

[22] PCT Filed: Jan. 31, 1983

[86] PCT No.: PCT/GB83/00021
§ 371 Date: Sep. 30, 1983
§ 102(e) Date: Sep. 30, 1983

[87] PCT Pub. No.: WO83/02633
PCT Pub. Date: Aug. 4, 1983

[30] Foreign Application Priority Data

Feb. 1, 1982 [GB] United Kingdom ............... 8202847

[51] Int. Cl.$^4$ .............................................. F16D 1/12
[52] U.S. Cl. .................................. 403/141; 403/362; 403/171; 403/328; 248/160
[58] Field of Search ............... 403/362, 141, 142, 143, 403/137, 328, 122, 90, 171; 248/160, 288.5; 52/648

[56] References Cited

U.S. PATENT DOCUMENTS

| 1,822,389 | 9/1931 | Blakeley | 403/256 X |
| 2,029,532 | 2/1936 | Karcher | 403/141 X |
| 3,356,394 | 12/1967 | Chamayou | 403/171 |
| 3,472,539 | 10/1969 | Fenwick | 403/328 X |
| 3,632,147 | 1/1972 | Finger | 403/171 |
| 3,789,562 | 2/1974 | DeChicchis et al. | 403/171 X |
| 4,461,439 | 7/1984 | Rose | 403/141 X |

FOREIGN PATENT DOCUMENTS

| 2421758 | 3/1975 | Fed. Rep. of Germany . | |
| 688685 | 3/1953 | United Kingdom | 403/90 |
| 1033108 | 6/1966 | United Kingdom | 403/362 |

Primary Examiner—Cornelius J. Husar
Assistant Examiner—Joseph A. Fischetti
Attorney, Agent, or Firm—Dressler, Goldsmith, Shore, Sutker & Milnamow, Ltd.

[57] ABSTRACT

A connector 11 for connecting tubular bars at variable mutual angles by means of a spherical attachment member 13 with tapped holes 26. The connector 11 has a lockable ball 31 and socket 32 joint from which a bolt 23 extends for engagement in the tapped holes 26. The connector also has a lockable snap-fit assembly 24 arranged to engage a tubular bar located over the body of the connector 11.

8 Claims, 6 Drawing Figures

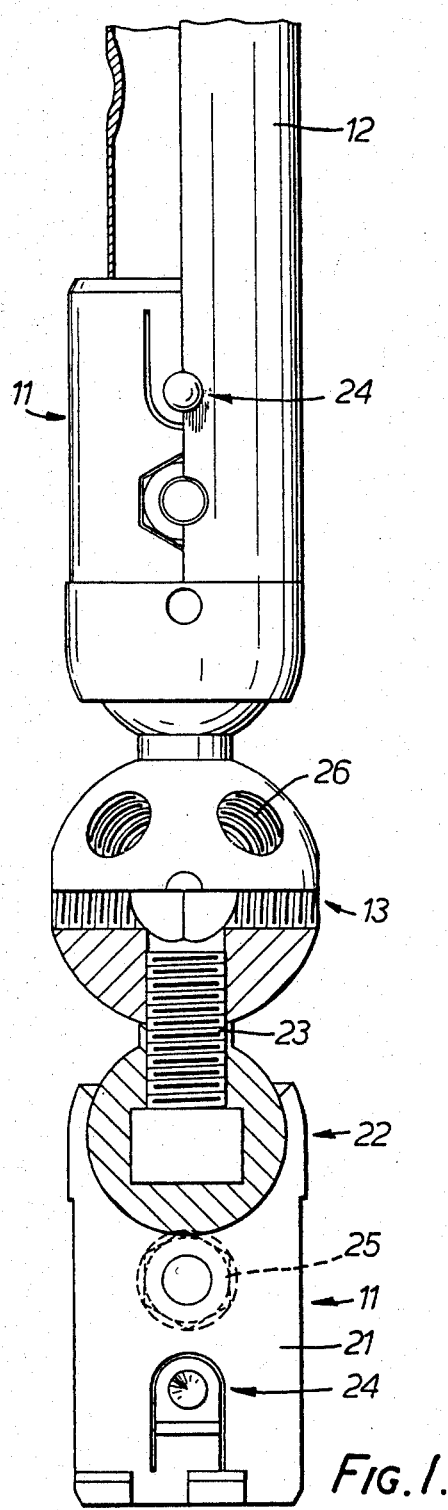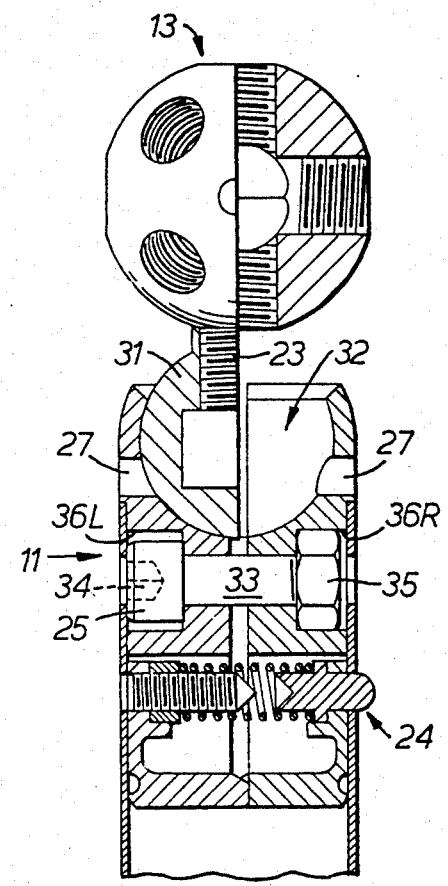
FIG. 1.
FIG. 2.

CONNECTOR FOR TUBULAR BARS AND ATTACHMENT MEMBERS IN A SPACE FRAMEWORK

The present invention relates to a connector for tubular bars and attachment members in a space framework. For example, a framework in which it is desired to connect a number of hollow poles such as scaffold poles together at a single node.

In one known arrangement a tubular bar is connected to a spherical attachment connector having a series of tapped holes by means of a screw connection. The screw connection is welded to the tubular bar and is provided with a screw which engages a hole in the attachment connector. This arrangement suffers a number of disadvantages. Firstly, it is not possible to remove the connector from the tubular bar and secondly, the connector can be attached to the attachment connector in only one orientation.

It is an object of the present invention to provide a connector for tubular bars and attachment members in a space framework which may be readily attached and detached from a tubular member.

It is a further object of the invention to provide such a connector which can be attached to an attachment member in a variety of orientations, in each attachment position.

It is a further object of the invention to provide a system having a number of independently adjustable connectors at each attachment member.

According to the invention a connector for tubular bars and attachment members in a space framework comprises a generally cylindrical body portion adapted to engage a tubular bar, a snap fit assembly for locating the connector with respect to the tubular bar, an engagement means adapted to engage an attachment member, the engagement means being connected to the body portion through an adjustable swivel joint, and releasable locking means for locking the swivel joint.

The engagement means preferably comprises a screw-threaded member arranged to engage a tapped hole in an attachment member. Alternatively, the engagement means may be a tapped hole and the attachment member may have a number of screw-threaded members protruding from its surface.

Preferably, the snap fit assembly is lockable. The swivel joint may comprise a ball and socket joint with the screw threaded member projecting from the ball, or it may comprise an assembly which allows the screw-threaded member to rotate about two mutually perpendicular axes simultaneously, with respect to the body portion.

The body portion may comprise two similar halves moulded from an aluminium alloy. The locking means may comprise a bolt arranged to draw the two halves together in order to lock the swivel joint or, in the case of a ball and socket joint, the locking means may comprise a pair of wedges which, when screwed together are adapted to engage the ball. A reinforcing collar may surround the two halves of the body in the region of the socket.

The invention also extends to a combination of such a connector with an attachment member in the form of a generally spherical member having a series of symmetrically arranged tapped holes.

As will be seen, using connectors in accordance with the invention, a number of tubular bars may be connected together at their ends at an attachment member at variable angles to one another, to form a space framework of almost any desired shape and configuration. Furthermore, the framework may be easily assembled by means of the snap fitting action and arranged into the correct orientation before being locked in position. The snap-fit assemblies can then be locked to render the framework even more rigid.

Finally, the framework can easily be dismantled by unlocking and releasing the snap-fit assemblies. If the swivel-joints and attachment members are not dismantled, the structure may be re-assembled in the same form as prior to dismantling without the necessity to re-adjust the orientations of the tubular members. Alternatively, if only the swivel-joints are unlocked, the structure may be folded up without the necessity to dismantle.

Although in all the constructions shown, the connector connects tubular bars to attachment members, the connector according to the invention can be used to attach the bars directly to suitably formed tapped holes in an existing structure or floor.

The invention may be carried into practice in various ways, and some embodiments will now be described by way of example with reference to the accompanying drawings in which:

FIG. 1 shows, partly in section, two connectors according to the invention connected to an attachment member, one of the connectors engaging a tubular bar, FIG. 2 shows, partly in section a first embodiment of a connector according to the invention;

Figure 3:
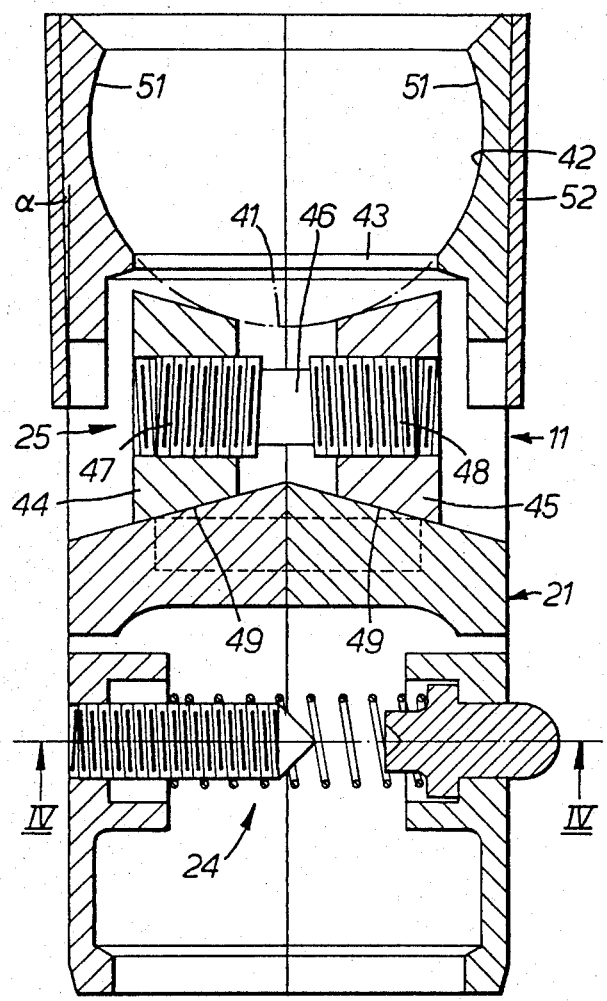
FIG. 3 is a vertical section through a second embodiment of the connector to an increased scale and with the ball of the swivel-joint omitted for clarity.

As shown in FIG. 1, a connector 11 connects a tubular bar 12 to an attachment member 13. The connector comprises a body portion 21, a swivel joint indicated generally by reference numeral 22 and having a screw threaded bolt 23 protruding from it, a snap-fit assembly indicated generally by reference numeral 24 and a lock 25 for the swivel-joint. The tubular bar 12 is a simple scaffold pole which fits over the body portion 21 of the connector 11. The attachment member 13 is a spherical node having a series of tapped holes 26 into which the bolts 23 fit.

In the connector 11 shown in FIG. 2, the swivel joint 22 is in the form of a ball 31 and socket 32. The socket 32 is formed in one end of the body portion 21 which itself comprises two halves (left and right in FIG. 2). The screw threaded bolt 23 is set into the ball 31.

The lock 25 comprises a bolt 33 having a hexagonal recess 34 in its head, and a nut 35 which engages the screw-threaded end of the bolt 33. The left and right hand halves of the body portion 21 are formed with similar hexagonal holes 36L and 36R. The bolt 33 passes through the two holes 36L and 36R with its head in the hole 36L and its threaded end engaging the nut 35 which is located in the hole 36R. The nut 35 is prevented from rotating in the hole 36R, thus, as the bolt 33 is rotated in one sense it tends to draw the two halves of the body portion together, so clamping the ball 31 in its socket 32. Rotation in the other sense allows the two halves to move apart thus freeing the ball 31. The connector 11 is provided with two holes 27 in the body portion 21 by means of which the ball 31 may be locked more permanently. Either glue may be introduced through the holes 27 or they may be used as drill guides to drill through the ball 31 so that a bolt may be passed through, thus locking the ball 31. The holes 27 may also be used as guides for rivetting.

The snap-fit assembly 24 is similar to that shown in detail in FIG. 4 and will be described below.

The connector 11 shown in FIG. 3 has a body portion 21 made up of two halves similar to that shown in FIG. 2, and also has a ball and socket joint. However, the socket 42 has a rear opening 43 and the ball (not shown) takes up a position indicated by the broken line 41.

The lock 25 comprises a pair of wedge members 44, 45 and a screw 46 having a left hand thread 47 at one end and a right hand thread 48 at the other end. The two halves of the body member 21 each have an inclined face 49 as shown in FIG. 3. The wedge members 44, 45 are each arranged with one face in contact with one inclined face 49 and an opposite face adjacent the surface of the ball in the rear opening 43.

Rotation of the screw 46 in one sense draws the two wedge members 44, 45 towards one another and so towards the ball, in part due to the action of the inclined surfaces 49 and in part due to the outline of the ball. This forces the ball towards the lip region 51 of the socket 42 and locks the joint. Rotation of the screw 46 in the opposite sense has the opposite effect and so releases the joint.

In order to strengthen the clamping force of the lip region 51 on the ball, a strong metal collar 52, of for example stainless steel, is driven over the two halves of the body portion 21 in the region of the socket 42 thus surrounding the lip region 51. A tight fit is ensured by providing the body portion 21 with a slight outward taper, indicated by the angle α, over which the collar 52 is located.

Figure 4:
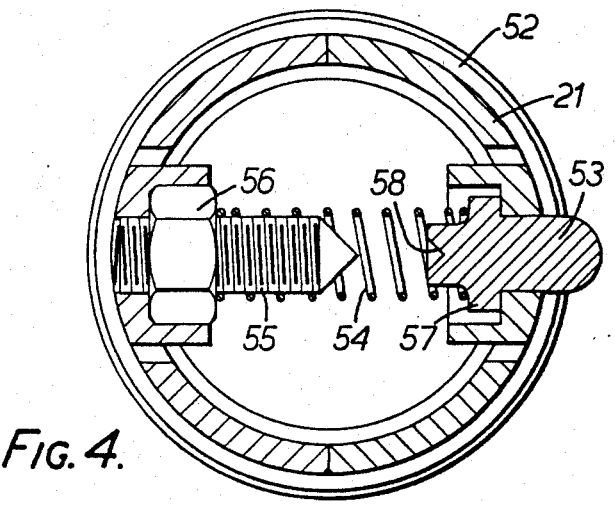
FIG. 4 is a section on the line IV—IV in FIG. 3.

The snap-fit assembly shown in FIG. 3 and in greater detail in FIG. 4 comprises a popper 53, a spring 54, a grub screw 55 and a nut 56 set in one half of the body portion 21. The popper 53 extends through a hole in the other half of the body portion 21 and has a flange 57 abutting the perimeter of the hole so that the end of the popper 53, which is rounded, stands proud of the outer surface of the body portion 21. The grub screw 55 passes through the nut 56 and extends towards the popper 53. The spring 54 is positioned on the grub screw 55 and is under compression acting between the nut 56 and the flange 57 on the popper 53. Thus, if the popper 53 is depressed against the spring 54, a tubular bar may be passed over the body portion 21. The bar would be formed with a hole into which the popper could extend to achieve a snap-fit.

To lock the popper, preventing its being depressed (as might be required if a tubular bar is located on the body portion 21), the rear of the popper is formed with a recess 58 corresponding to the point of the grub screw 55. Thus, the grub screw 55 would be screwed through the nut 56 so that the grub screw 55 would engage the recess 58, locking the popper 53 in place.

Figure 5:
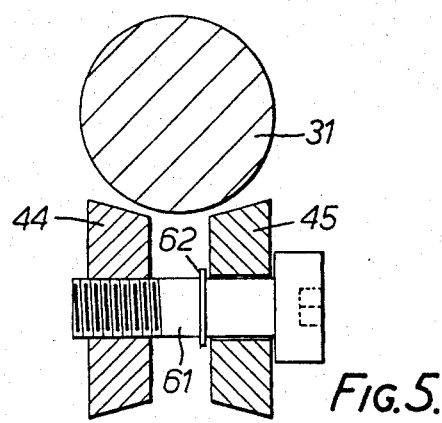
FIG. 5 is a section through an alternative form of the swivel-joint locking means of FIG. 3.

The alternative construction shown in FIG. 5 for locking the ball and socket joint of FIG. 3 differs from that shown in FIG. 3 in that the screw 46 is replaced by a bolt 61. The wedge member 44 engages the screw thread on the bolt 61 while the other wedge member 45 is located at the head end of the bolt 61 by means of a retaining ring 62 which is located in a slot in the bolt 61. The wedge member 45 is free to rotate on the bolt shaft, either by its having a larger bore than that of the wedge member 44 or by the bolt shaft having a portion of reduced diameter between its head and the ring 62. This construction works in a similar way to the construction shown in FIG. 3, except that in the FIG. 5 construction the wedge member 45 does not move relative to the bolt 61, rather, the wedge member 45 moves with the bolt 61.

Figure 6:
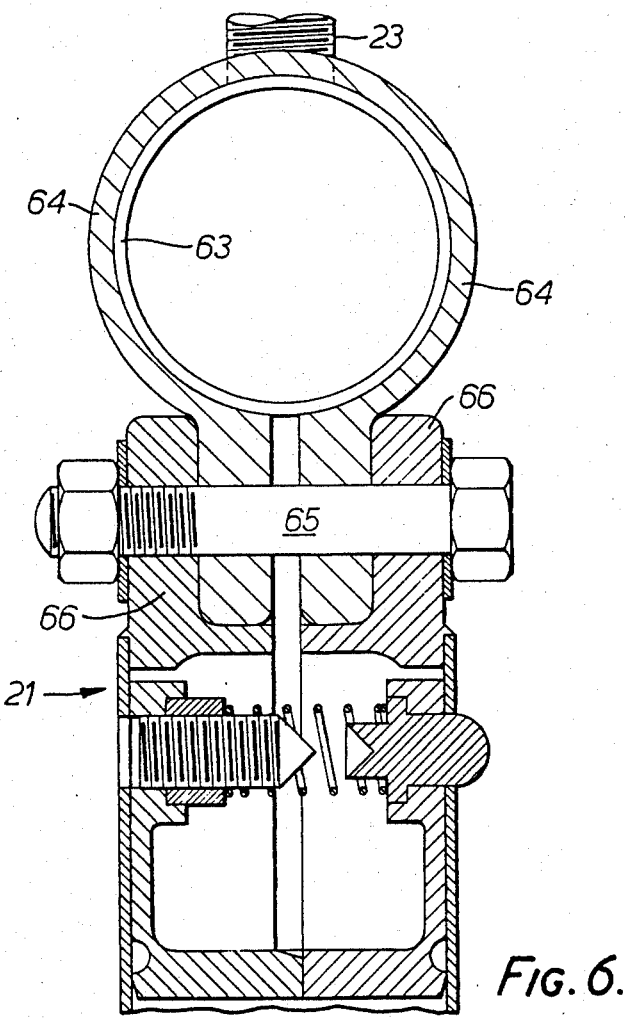
FIG. 6 is a view similar to FIG. 3 showing a third embodiment of connector.

FIG. 6 shows a third embodiment of connector which is similar to that shown in FIG. 3 other than in the construction of the swivel-joint. In this embodiment, the screw-threaded bolt 23 is mounted on a tube 63 which is located in a cylindrical recess formed by two jaws 64. The jaws 64 each have a channel (not shown) arranged to allow the screw-threaded bolt 23 to rotate with the tube 63 about the axis of the tube 63. The jaws 64 are rotatably mounted on a bolt 65 whose axis is at right angles to the axis of the tube 63. Thus, the screw threaded bolt 23 can rotate about two mutually perpendicular axes.

The bolt 65 also passes through a pair of shoulders 66 on the body portion 21, which are located outside the portions of the jaws 64 through which the bolt 65 passes. Thus, as the bolt 65 is tightened, the jaws 64 are clamped against the shoulders 66 preventing rotation about the bolt 65, and at the same time, the jaws 64 are clamped about the tube 63 preventing its rotation within the cylindrical recess.

As an alternative attachment member to the spherical node 13, it is possible to use a short length of tubing having a series of holes drilled straight through at various angles. The threaded bolts 23 on the connectors can then be passed into the holes and held in position by means of nuts. A four-way connector could have two pairs of holes drilled through at right-angles and so on.

I claim:

1. In a space framework comprising a plurality of tubular bars and attachment members, a plurality of connectors interconnecting said bars and said attachment members, each said connector comprising: a cylindrical body portion located within one end of one of said bars; said body portion and one end of said bar defining corresponding holes, a snap-fit assembly including bolt means, locatable in said corresponding holes, spring means urging said bolt means into said corresponding holes, and a grub screw which can selectively be brought into abutment with said bolt means to lock said bolt means in position in said corresponding holes, releasably interengaging said body portion and said one bar; an engagement member engaging one of said attachment members; adjustable swivel-joint means interconnecting said body portion and said engagement member; and releasable locking means operatively associated with said swivel-joint means, whereby said engagement member can be adjusted to a desired orientation with respect to said body portion by virtue of said swivel-joint and locked in said desired orientation by means of said locking means.

2. The connector of claim 1 wherein said engagement member is screw-threaded shaft.

3. The connector of claim 2 wherein said swivel-joint means comprises a part-spherical recess and a ball or part-spherical member located in said recess, and wherein said screw-threaded shaft projects from said ball or part spherical member.

4. The connector of claim 2 wherein said swivel-joint means comprises a joint assembly having two hinging means at mutually perpendicular axes.

5. The connector of claim 1 wherein said body portion comprises two similar halves molded from an aluminum alloy.

6. The connector of claim 5 wherein said locking means for said swivel-joint means comprises a bolt arranged to draw said two halves together, thereby locking said swivel-joint means.

7. The connector of claim 3 wherein said locking means for said swivel-joint means comprises a pair of wedge members interconnected by a screw, said wedge members engaging said ball or part spherical member upon rotation of said screw.

8. The connector of claim 3 further including a reinforcing collar surrounding said body portion in the region of said part-spherical recess.

* * * * *